(12) United States Patent
Berge

(10) Patent No.: US 7,448,159 B2
(45) Date of Patent: Nov. 11, 2008

(54) FISH SCENT DISPENSER

(76) Inventor: A. Wayne Berge, 18035 Elk Meadow La., Tillamook, OR (US) 97141

( * ) Notice: Subject to any disclaimer, the term of this patent is extended or adjusted under 35 U.S.C. 154(b) by 663 days.

(21) Appl. No.: 10/877,721

(22) Filed: Jun. 25, 2004

(65) Prior Publication Data

US 2006/0005455 A1    Jan. 12, 2006

(51) Int. Cl.
*A01K 85/01* (2006.01)
*A01K 97/02* (2006.01)

(52) U.S. Cl. .................... 43/42.06; 43/44.99
(58) Field of Classification Search ............ 43/42.06, 43/42.35, 44.2, 44.99
See application file for complete search history.

(56) References Cited

U.S. PATENT DOCUMENTS

| | | | |
|---|---|---|---|
| 1,497,199 A * | 6/1924 | Sutthoff | 99/323 |
| 2,465,127 A * | 3/1949 | Stark | 43/44.99 |
| 2,769,268 A * | 11/1956 | Miller | 43/42.06 |
| 4,047,317 A | 9/1977 | Pfister | |
| 4,602,453 A | 7/1986 | Polley | |
| 4,736,542 A | 4/1988 | Floyd | |
| 4,787,167 A | 11/1988 | Wroclawski | |
| 4,888,907 A | 12/1989 | Gibbs | |
| 4,964,235 A | 10/1990 | Gruelle | |
| 5,170,579 A | 12/1992 | Hollinger | |
| 5,319,875 A * | 6/1994 | Brandolino | 43/42.06 |
| 5,321,906 A | 6/1994 | Bommarito | |
| 6,298,595 B1 | 10/2001 | Friedlob | |
| 6,711,849 B1 * | 3/2004 | Moretti | 43/44.99 |
| 6,779,293 B1 * | 8/2004 | Rice | 43/42.06 |
| 2002/0050089 A1 | 5/2002 | Dixon | |
| 2003/0046856 A1 | 3/2003 | Klapka | |
| 2003/0075613 A1 | 4/2003 | Brown | |
| 2003/0126785 A1 | 7/2003 | Poinski | |

FOREIGN PATENT DOCUMENTS

GB        2255485 A    *  11/1992

OTHER PUBLICATIONS

Advertisement for "Scent Solution," Sy's Jigs & Flies, unknown fishing magazine; at least as early as Jun. 25, 2004.

* cited by examiner

*Primary Examiner*—Darren W Ark
(74) *Attorney, Agent, or Firm*—Chernoff, Vilhauer, McClung & Stenzel, LLP

(57) ABSTRACT

A fishing accessory suitable to hold and selectively release fish scent into water.

25 Claims, 5 Drawing Sheets

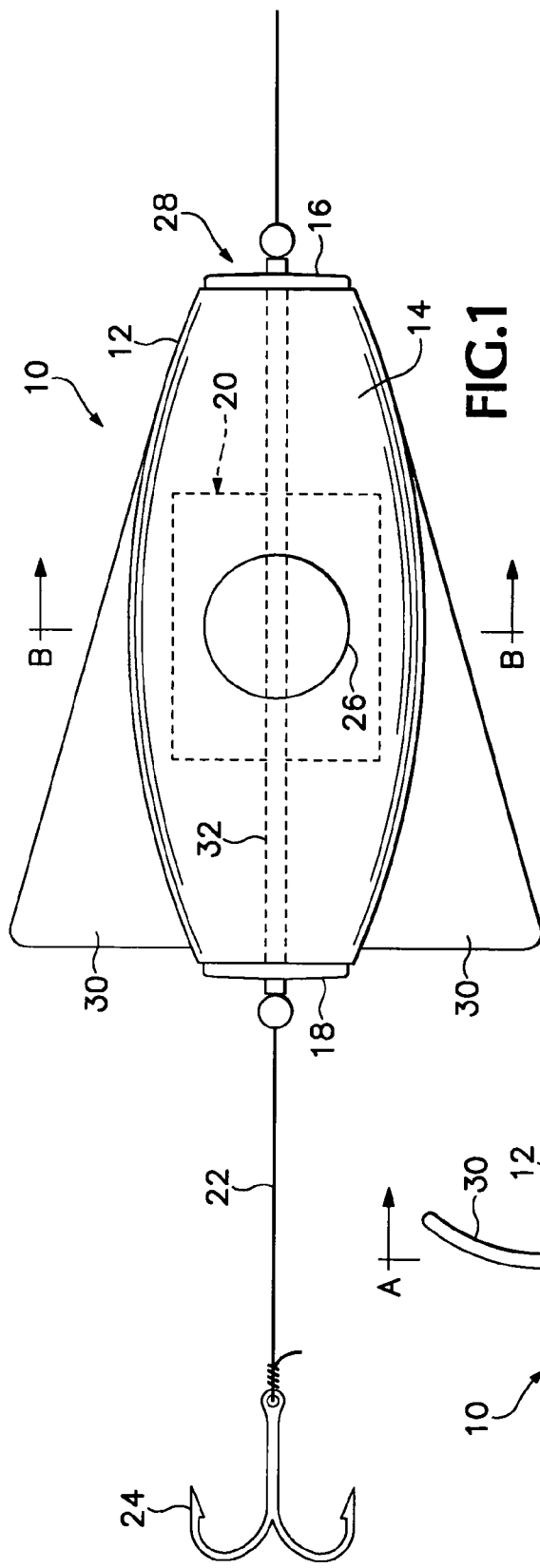

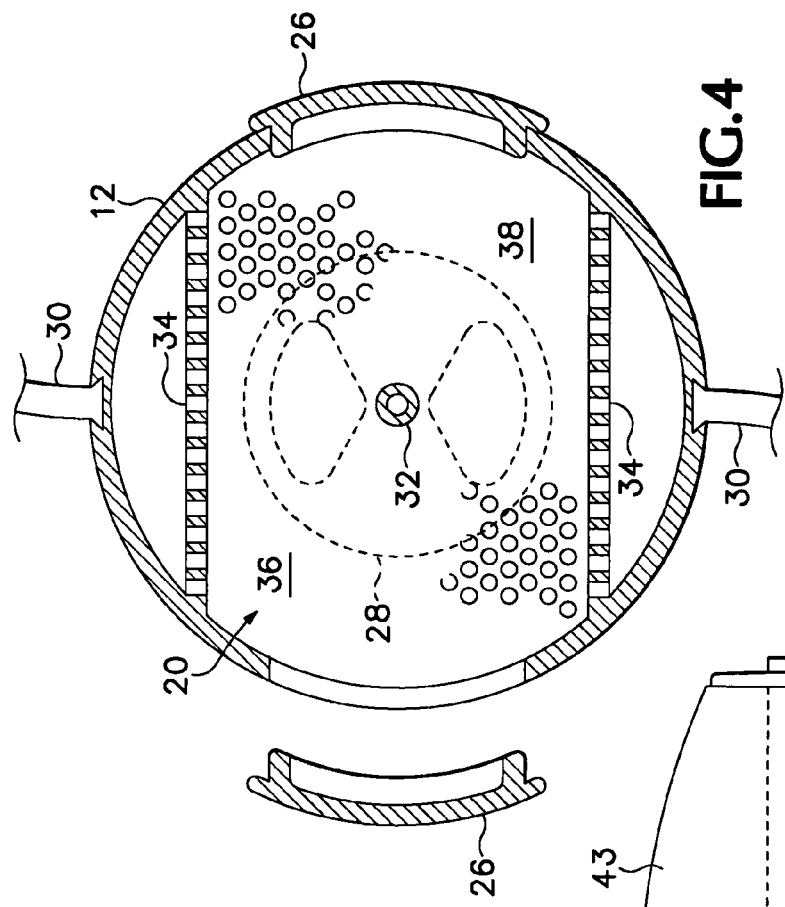
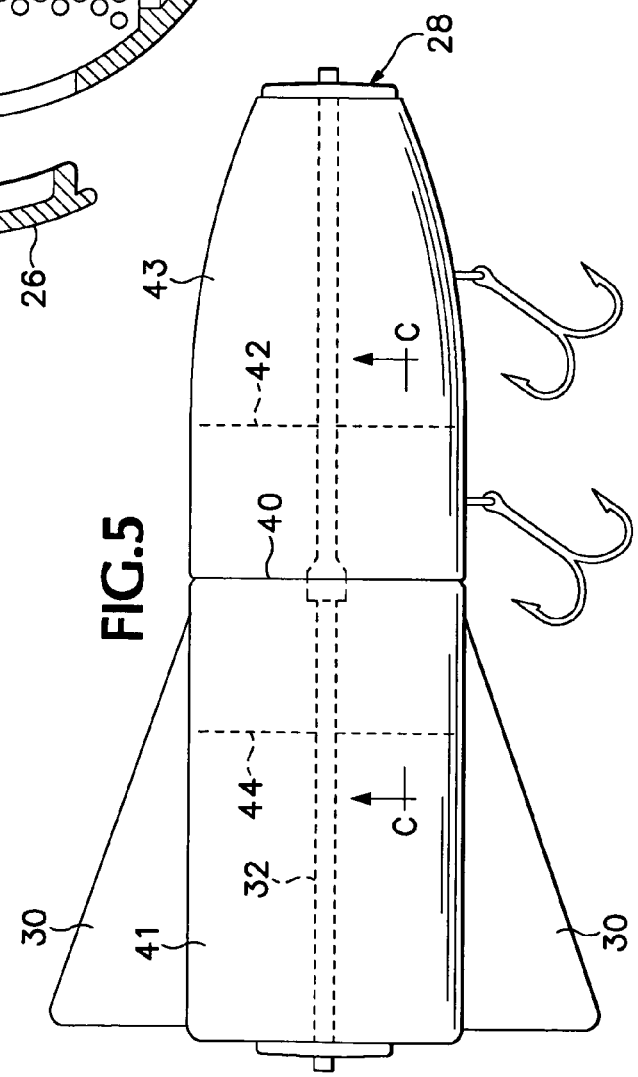

FISH SCENT DISPENSER

BACKGROUND OF THE INVENTION

The present invention relates to a scent delivery system used to trick a fish into biting a very sharp hook.

Sport fishing inherently requires that a fish bite down on a hook so that the fish can be reeled in. Fish hooks, however, are not something at which fish would normally be inclined to bite. Therefore, the savvy fisherman will disguise the hook to appear to be something a little less foreboding i.e., something other than a hook, and more preferably something the fish might want to eat. Traditionally, this could simply involve placing a worm or other live bait on the hook. Though live bait can be effective, it has drawbacks. First, live bait has a tendency to slip off the hook, particularly when trolling. Second, live bait usually won't survive a fish bite, whether or not the fish actually gets hooked in the process. Thus live bait must be replaced repeatedly when fishing.

One alternative to live bait is a fishing lure, typically of plastic or metal construction and generally of a shape that simulates something a fish might eat, a smaller fish for instance. A fishing lure will usually have one or more hooks dangling from it so as to retain any fish unfortunate enough to have bitten the lure. Existing fishing lures are often shiny and/or designed to spin when moving relative to water to visibly emulate the behavior of something the fish might enjoy eating. Unlike live bait, fishing lures do not slip away from the line when trolling and hold up rather well in the mouth of a fish, even one with teeth like pike or grayling.

One problem with lures, however, is that fish have a relatively refined sense of smell which they use to detect and pursue food. Whereas live bait will emit an aroma that attracts fish from a distance, a lure will typically not. Finding this sacrifice unacceptable, the technologically savvy fisherman will use a scent dispenser in conjunction with the fishing lure to attract a distant fish towards the lure. Once the fish is in close proximity to the lure, the fish will reflexively bite at it when it flashes or spins.

Most existing fish scent dispensers are designed to release a liquid fish scent into the water surrounding the lure. For example, the scent dispensers exemplified in U.S. Pat. Nos. 5,321,906 and 4,602,453 use inflatable bladders to contain pressurized liquid scent material such as fish oil. When fishing, liquid scent is released into the water by its internal pressure through a narrow opening to trail downstream of the lure, attracting fish. Such inflatable bladders may be attached to a fishing line in proximity to the lure or may be contained in the lure itself, as exemplified in U.S. Pat. Nos. 5,170,579 and 4,888,907. Unfortunately, these existing types of scent dispensers have several disadvantages. First, relying upon the internal bladder pressure to release the liquid scent, they tend to initially release too much scent, but later too little scent into the water. Second, the liquid scent in the bladder does not last a very long time, and the bladders are difficult to refill with scent, in some cases requiring injection with a hypodermic needle. Finally, these scent dispensers require cleaning after each use to prevent the liquid scent material from clogging the narrow opening as it dries.

Alternative existing scent dispensers use chums, or solid scent material that trails a lure or bait in water. These chums tend to last longer than the aforementioned bladder-type dispensers, but do not allow for the dispensed scent to be adjusted. Instead, the amount of scent released is proportional to the speed at which the chum is moving through water, which may not be ideal.

What is desired, therefore, is an improved dispenser for releasing scent into water when fishing.

BRIEF DESCRIPTION OF THE DRAWINGS

FIG. 1 shows a top view of a fishing apparatus incorporating a disclosed scent delivery system.

FIG. 2 shows a front view of the fishing apparatus of FIG. 1.

FIG. 4 shows a sectional view of the fishing apparatus of FIG. 1 taken along line B-B shown in FIG. 1.

FIG. 5 shows an alternative fishing apparatus to that shown in FIGS. 1-3.

DETAILED DESCRIPTION

Figure 3:
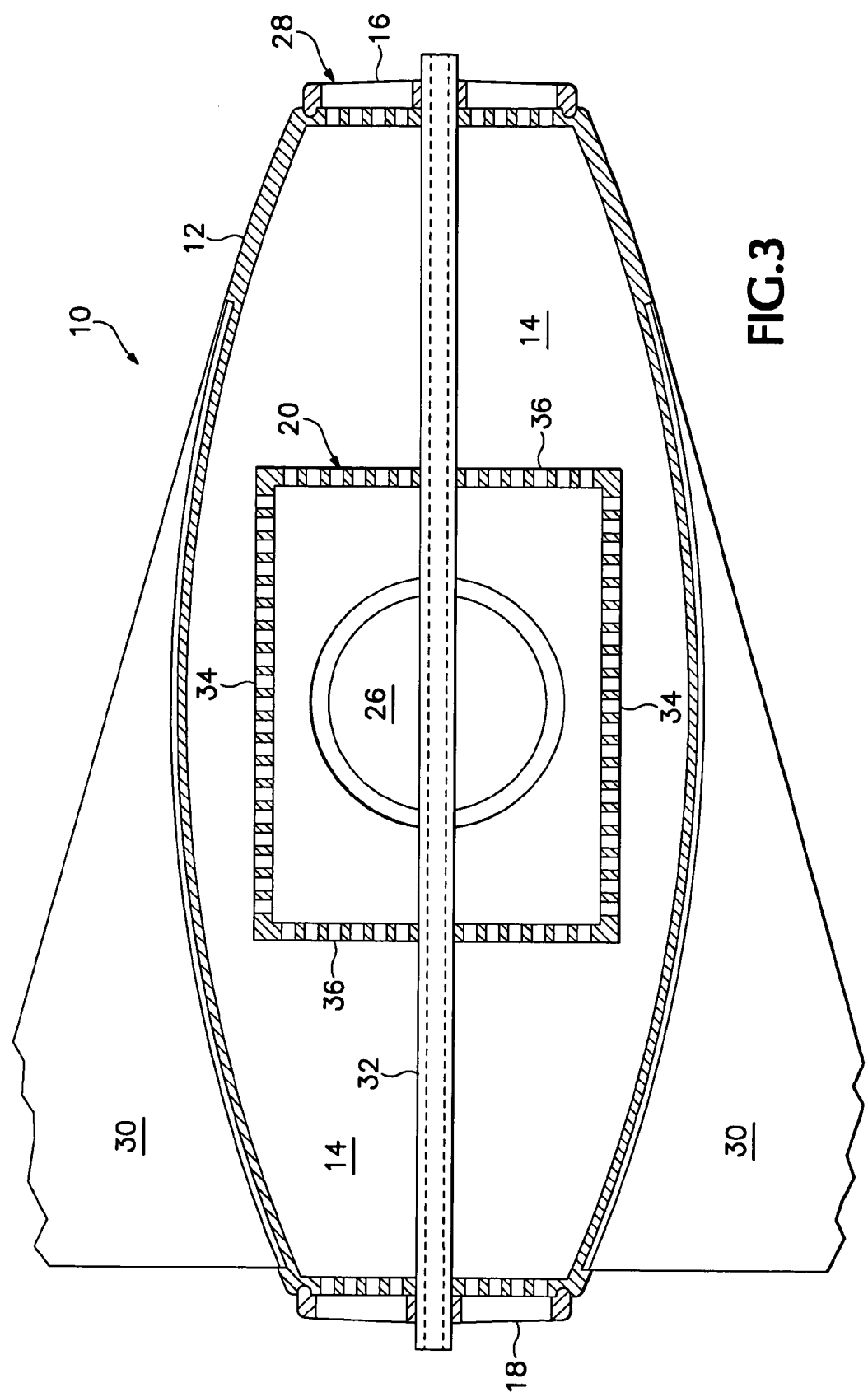
FIG. 3 shows a sectional view of the fishing apparatus of FIG. 1 taken along line A-A shown in FIG. 2.

FIGS. 1-4 show a fishing accessory 10 selectively attachable to a fishing line 22 with a hook 24 at the end of the fishing line 22. The fishing accessory 10 includes an outer member 12 defining an enclosure 14. The outer member 12 has an inlet 16 and an outlet 18 that cooperate to permit water to flow through the enclosure 12 when the fishing accessory 10 is immersed into water moving relative to the fishing accessory 10. The fishing accessory 10 also includes a retainer 20 suitable to retain fish scent.

The retainer 20 preferably is suitable to retain solid fish scent, such as fish eggs, a sponge or cotton soaked in fish oil, a manufactured solid scent material such as the chum disclosed in U.S. Pat. No. 6,298,595, or even live bait such as worms. Solid scent material usually lasts longer than liquid scent material and is dispensed from the fishing accessory 10 at a more constant rate than liquid scent material. The fishing accessory 10 also preferably includes one or more access members 26 to facilitate replacement of the fish scent within the retainer 20. The access members 26 may be of a plug-type construction as shown in FIG. 2, may be threaded to screw into the fishing accessory 10, or may be selectively securable to the outer member 12 in any desired fashion.

The fishing accessory 10 may include an adjustable valve 28 at either or both the water inlet 16 or water outlet 18. The adjustable valve 28 permits a user to adjust the flow of water through the enclosure 12, and therefore the rate at which scent from the retainer 20 is released into the surrounding water to attract fish towards the hook 24.

The fishing accessory 10 improves on existing fish scent dispenser systems in several ways. First, the fishing accessory 10 permits fish scent to be released into water a controlled rate that does not tend to vary over time, as do the existing bladder-type dispensers. Where solid scent is contained in the fishing accessory 10, that solid scent tends to last a much longer time than liquid scent material, or even a solid chum dragged through water because the adjustable valve or valves permit a user to reduce the flow rate over, or through, the scent material in the retainer 20 with respect to the flow of water over a chum that is simply dragged through water as taught by U.S. Pat. No. 6,298,595.

Second, because the fishing accessory 10 allows the fish scent to be intermixed or diluted in water prior to the scent flowing out of the outlet 18, the fish scent will not tend to dry and clog the outlet between uses. This represents a marked advantage over the existing, bladder-type scent dispensers which require an oily, liquid fish scent to flow through a small aperture before being intermixed or diluted in water.

Third, the fishing accessory 10 permits the fish scent held by the retainer 20 to be easily replaced. Thus, after a solid or liquid scent is completely used, the new scent may be quickly replenished in the retainer 20. Moreover, certain fish may be attracted to a certain type of fish scent. Whereas existing scent dispensers would require removal from the fishing line and replacement with another dispenser having the appropriate fish scent, the fishing accessory 10 permits quick replacement of the appropriate scent material while the accessory 10 remains on the fishing line 22.

These enumerated advantages are not intended to be exhaustive as the fishing accessory 10 may have a variety of uses, aspects, or functions not present in existing fish scent dispensers.

The retainer 20 may be any member that permits water to flow over or through any fish scent retained by the retainer 20 so that the water picks up the fish scent before exiting the water outlet 18. The retainer 20 may preferably be porous. For example, FIGS. 1-3 show a wire mesh as the retainer 20. The wire mesh preferably encloses at least a portion of the fish scent retained by the retainer 20 and is porous so that water may flow freely through the portion of the retainer 20 enclosing the fish scent. Alternatively, the retainer 20 could be a sponge, a solid enclosure punctured by a plurality of holes, thin fibrous material such as cotton or polyester or any other similar member. Furthermore, the retainer 20 need not be porous. For example, the retainer 20 could comprise one or more retractable prongs that selectively pierce and retain solid scent within a fixed region.

The retainer 20 may be secured to the outer member 12 in any convenient fashion. As seen in FIGS. 3 and 4, the wire mesh or other retainer 20 may include opposed side members 34 secured to the inner surface of the outer member 12 and opposed end members 36 each secured to the opposed side members 34. The retainer 20, thus constructed may include opposed top and bottom openings 38 aligned with the removable covers 26 to facilitate insertion of scent material into the retainer 20 e.g., the wire mesh.

Preferably, the retainer 20 is positioned to retain fish scent at a location spaced apart from the water outlet 18. This helps to ensure that any solid fish scent in the retainer 20 does not obstruct the flow of water out of the enclosure 14 and into the surrounding water. For example, the enclosure 14 may define a self-bounded, inwardly directed surface that defines the water outlet 18 and the water inlet 16. The retainer 20 may preferably be positioned at a location that is substantially spaced apart from a portion of the inwardly directed surface, and more preferably, that portion of the inwardly directed surface that defines the water outlet 18. Further, it should be noted that although FIGS. 1-4 show a fishing accessory 10 of a generally elongate shape, the fishing accessory 10 may be of any desired shape, including a spherical shape or other shape symmetric about a transverse centerline where either outlet 16 or 18 could serve as a water inlet or water outlet, respectively. Therefore, it would also be preferable for the fishing accessory 10 to include a retainer 20 positioned to retain fish scent at a location spaced apart from both the water inlet 16 and the water outlet 18 so that the fishing accessory 10 may be oriented in any desired direction along a fishing line.

The fishing accessory 10 may include plural fins 30, preferably detachable. The fins 30 may each have a matching clockwise or counterclockwise bend to facilitate rotation of the fishing accessory 10 as it moves through water. As the fishing accessory 10 spins in water, it will tend to attract fish towards the hook 24. In the same vein, the outer member 12 or the fins 30 may include one or more reflective regions or flashing lights to attract fish towards the hook.

To facilitate attachment of the fishing accessory 10 to a fishing line 22 at a location upstream of the hook 24, the fishing accessory 10 may include a sleeve 32 along the longitudinal centerline of the accessory 10, through which a fishing line may be inserted. The sleeve 32 may also pass through the retainer 20.

Also, although FIGS. 1-4 show a fishing accessory 10 mountable on a fishing line 22 upstream of a hook 24, the fishing accessory 10 may easily be a lure as indicated in FIG. 5. In that instance, the sleeve 32 would be unnecessary as the fishing line could simple be attached to the inlet end of the accessory 10. The aforementioned fins 30 and reflective regions would be particularly suited to a fishing accessory 10 configured as a lure, although not necessary.

Figure 6:
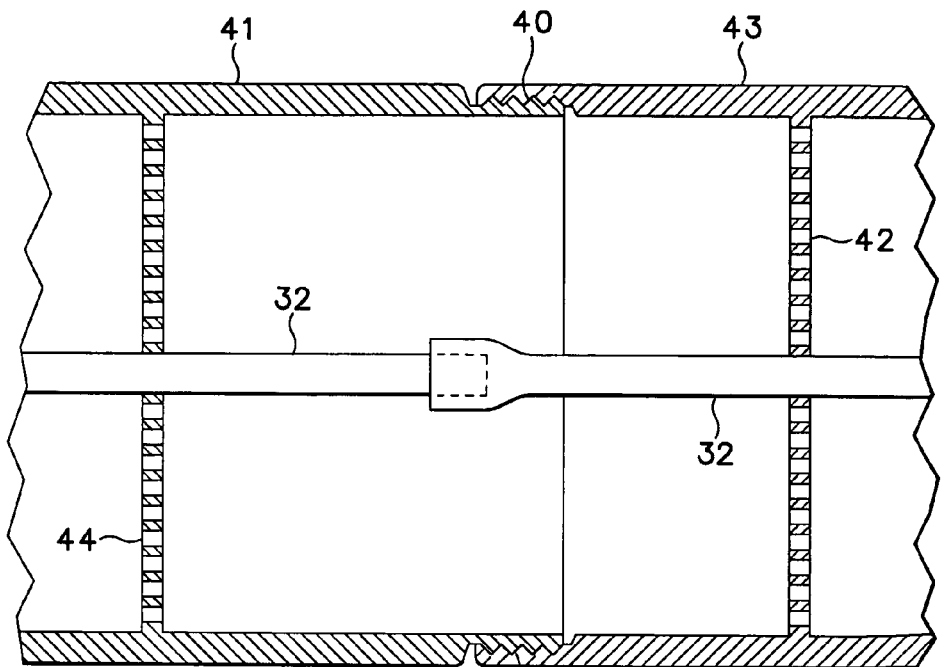
FIG. 6 shows a sectional view of the fishing apparatus shown in FIG. 5 taken along line C-C.

FIGS. 5 and 6 show a fishing accessory 10 having a construction that obviates the need for any removable covers. In this configuration, the outer member 12 is selectively separable about a threaded connection 40 at the approximate midpoint of the longitudinal axis of the fishing accessory 10. Separation occurs by twisting the outer member 12 about the threaded connection 40 i.e., twisting a rear portion 41 of the outer member 12 relative to a front portion 43 of the outer member 12. In this instance, the retainer 20 may simply comprise opposed members 42 and 44 each mounted to the inner surface of the outer member 12 at a respective side of the threaded connection 40. The sleeve 32 is also separable, threadably or otherwise, to facilitate separation of the rear portion 41 and the front portion 43 when inserting or replacing scent material into the retainer 20. The fishing accessory 10 depicted in FIGS. 5 and 6 may also include an inlet 16 defined in the front portion 43, an outlet 18 defined in the rear portion 41, and fins 30 symmetrically positioned about the rear portion 41.

Referring to FIGS. 2, 5, 7, and 8, the inlet 16 and/or the outlet 18 may be an adjustable valve 28 comprising a first member 50 defining one or more inner openings 52. The first member 40 may be integral with the outer member 12 as may comprise a separate member. An adjustment member 54 may define one or more outer openings 56 and be rotatably mounted to the first member the so that the adjustment member 54 may cover all, none, or a selected portion of the openings 52. The adjustable valve 28 advantageously permits a user to select one of a plurality of continuous, nonzero flow rates through the enclosure. By controlling the rate of water flowing through the enclosure, a user is able to adjust the rate of scent being released into the water to a desired level that best approximates the scent of bait at which a fish would be attracted, but also control the longevity of the scent material retained by the retainer 20.

Figure 7:
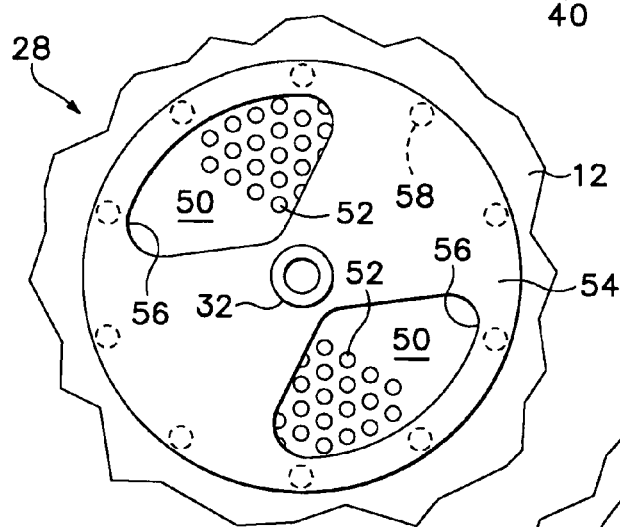
FIGS. 7 and 8 show a valve suitable for use with the disclosed scent delivery system.
Figure 8:
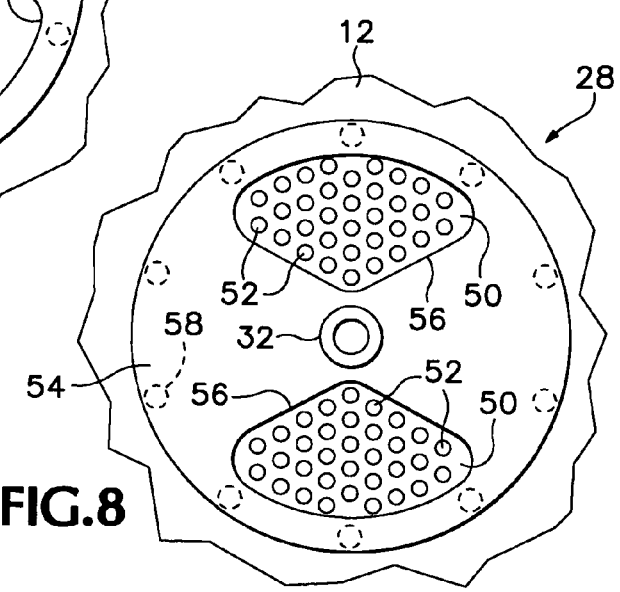

The first member 50 and the adjustment member 54 may be rotatably mounted to each other in any convenient manner, such as a pin, screw, rivet, etc. Further, although FIGS. 7 and 8 depict a salt-and-pepper type configuration where the region or regions of the first member 50 defining the openings 52 correspond in size to the region or regions of the adjustment member 54 defining the outer openings 56, other configurations are possible. For example, the adjustment member 54 could define a large number of small openings equal in number and size to those defined by the first member 50 so that the adjustable valve has only an on or offsetting with only one nonzero flow rate. Alternatively, each of the first member 50 and the adjustment member 54 could define a single large opening, such that the aperture into the enclosure 14, and hence the flow rate into the enclosure 14, depends on the relative position of the opening 52 and the opening 56.

The adjustable valve 28 may include a plurality of respective bump-and-socket members 58 that cooperate to prevent inadvertent rotation of the adjustment member 54 with respect to the first member 50. Further, the first member 50 that defines the one or more inner openings 52 is preferably integral with the outer member 12 that defines the enclosure 14, although it could be a separate member as well.

Figure 9:
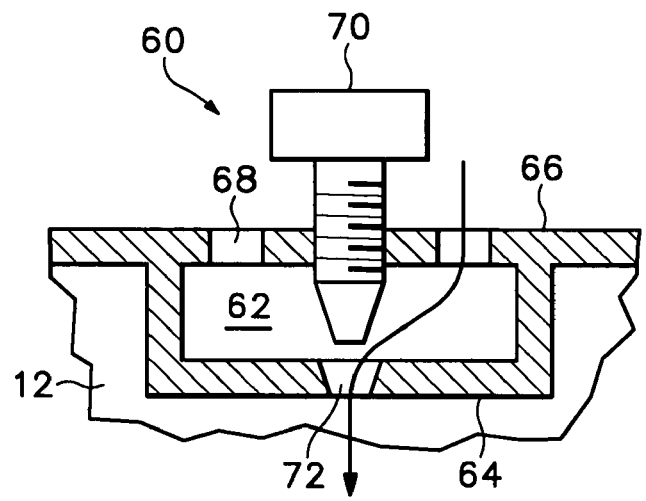
FIGS. 9-11 each show alternative valves suitable for use with the disclosed scent delivery system.

When it is desired to include one or more valves with the fishing accessory 10, any one of a wide variety of valves may be selected besides the adjustable valve 28 shown in FIGS. 2, 7, and 8. For example, FIG. 9 shows a needle valve 60 in which the outer member 12 defines a valve enclosure 62 isolated from the enclosure 14 by a wall member 64 and isolated from the outer environment by a wall member 66. The wall member 66 includes an annular opening 68 that encircles a threaded pin 70, rotation of which selectively opens or closes an opening 72 from the valve enclosure 62 into the enclosure 14. In operation, immersion of the accessory 10 will flood the valve enclosure 62 with water. The position of the pin 70 with respect to the opening 72 will determine the rate at which water flows from the valve enclosure 62 into the enclosure 14. It should be noted that the design of the needle valve 60 shown in FIG. 9 is exemplary only, and can be changed to accommodate different shapes of the openings 68 and 72, the number of openings 68 and 72, the shape and number of pins 70 and the number of valve enclosures 62.

Figure 10:
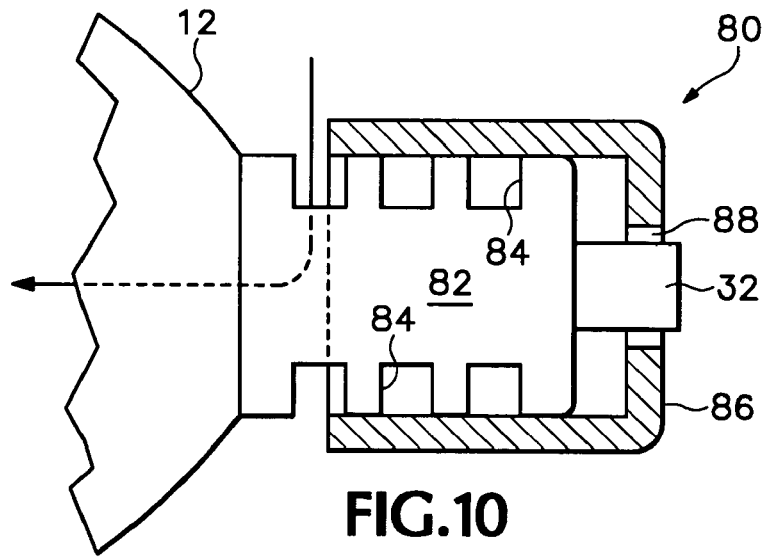

FIG. 10 shows another valve 80 suitable for use with the fishing accessory 10. The valve 80 may comprise a cylindrical neck portion 82 defining a plurality of annular slots 84. The neck portion 82 may be integral with the outer member 12, as desired. The slots 84 are selectively covered by a cap 86 that may slide along the neck portion 82 to expose a selected number of slots 84, and thereby adjust the flow rate of water through the valve 80. The cap 86 may also be positioned to expose only a portion of a slot 84. The cap 86 preferably includes an opening 88 to accommodate the sleeve 32.

Figure 11:
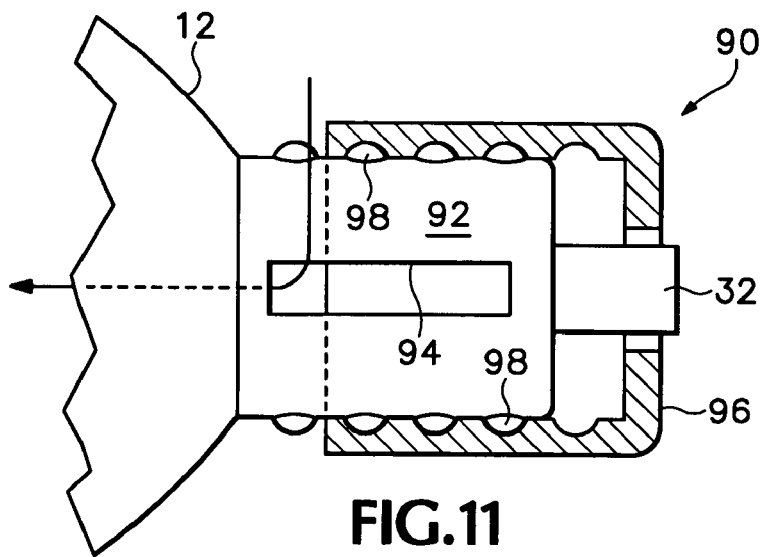

FIG. 11 shows another valve 90 suitable for use with the present invention. The valve 90 may comprise a cylindrical neck portion 92 defining one or more vertical slots 94. The slots 94 are selectively covered by a cap 96 that may slide along the neck portion 92 to expose a selected portion of the one or more vertical slots 94, thereby adjusting the flow rate of water through the valve 90.

Each of the valves 28, 60, 80, and 90 define an adjustable aperture into the enclosure 14. That is to say, the selected size of the aperture of each respective valve 28, 60, 80, or 90, determines a desired flow rate of water through the enclosure 14. Over time, repeated adjustment of any of the aforementioned valves may be expected to cause wear to the respective valve such that a constant, desired flow rate is not achieved. Although some embodiments of the disclosed fish scent dispenser may combine the access member 26 with a valve (e.g., a removable cap, rotation of which covers a selective portion of apertures at the periphery of the cap), such an access member 26 would hasten the wear on the valve. For that reason, it is preferably to ensure that use of the access member 26 does not adjust the position, setting, configuration, etc. of the selected inlet and/or outlet valve. FIGS. 1-4 show such a configuration. In addition, the valve 28, 60, 80, 90, or any other such valve could be located within the access member 26 such that removal of the access member 26 does not adjust the setting of the valve used.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only the claims that follow.

The invention claimed is:

1. A fishing accessory comprising:
    (a) an outer member securable to a fishing line and defining an enclosure having a water inlet and a water outlet together permitting the flow of water through said enclosure; and
    (b) a retainer within said enclosure and capable of releasably retaining fish scent within a region spaced apart from said water outlet.

2. The fishing accessory of claim 1 where said retainer is porous and shaped to enclose at least a portion of said fish scent.

3. The fishing accessory of claim 2 where said retainer comprises a wire mesh.

4. The fishing accessory of claim 1 where said retainer is positioned to retain said fish scent within a region spaced apart from said water inlet.

5. The fishing accessory of claim 1 where said retainer is suitable for retaining solid fish scent.

6. The fishing accessory of claim 5 where said solid scent material is a sponge soaked in liquid scent.

7. The fishing accessory of claim 1 where said enclosure has a self-bounded, inwardly directed surface and said retainer is substantially spaced apart from at least a portion of said surface.

8. The fishing accessory of claim 1 where at least one of said inlet and outlet comprises a valve.

9. The fishing accessory of claim 8 where said valve is adjustable.

10. The fishing accessory of claim 1 including an access member selectively operable to provide access to said enclosure.

11. The fishing accessory of claim 1 where said outer member is a lure.

12. The fishing accessory of claim 1 including an inner member capable of passing a fishing line through said outer member.

13. The fishing accessory of claim 1 including an inner member capable of passing a fishing line through said retainer.

14. A fishing accessory comprising:
    (a) an outer member securable to a fishing line and defining an enclosure suitable to contain fish scent;
    (b) an inlet valve and an outlet valve, each suitable to adjust a flow of water through said enclosure, and each of said inlet and outlet valve defining an aperture of an adjustable size into said enclosure.

15. The fishing accessory of claim 14 including an access member selectively moveable to a position that provides access to said enclosure, where movement of said access member to said position does not adjust the size of said aperture.

16. The fishing accessory of claim 14 where said valve is adjustable between an on and off position.

17. The fishing accessory of claim 16 where said valve permits a plurality of nonzero flow rates through said enclosure.

18. The fishing accessory of claim 17 where said valve comprises
    (a) a first member defining a plurality of openings into said enclosure; and (b) an adjustment member that selectively covers a selected portion of said openings.

19. The fishing accessory of claim 18 where said first member is integral with said outer member and said adjustment member is rotatably mounted over said first member.

20. The fishing accessory of claim 18 where said adjustment member is a cap slidably positioned over said first member.

21. The fishing accessory of claim 14 where said valve comprises an opening in said outer member selectively closable by a threaded pin member.

22. The fishing accessory of claim 14 where said valve comprises:

(a) a neck member defining at least one opening; and
(b) a cap slidably positioned over said neck member for selectively uncovering a desired portion of said at least one opening.

23. The fishing accessory of claim 14 including an inner retainer that isolates said fish scent from said outlet valve.

24. The fishing accessory of claim 23 where said retainer is porous.

25. The fishing accessory of claim 24 where said retainer is a wire mesh.

* * * * *